Nov. 18, 1969  C. JOHNSON  3,478,771
SECTIONAL BODY GATE VALVE WITH SEAT SCRAPING MEANS
Filed Sept. 15, 1967  3 Sheets-Sheet 1

INVENTOR
CLARENCE JOHNSON
by Strauch, Nolan, Neale, Nies and Kurz
ATTORNEYS

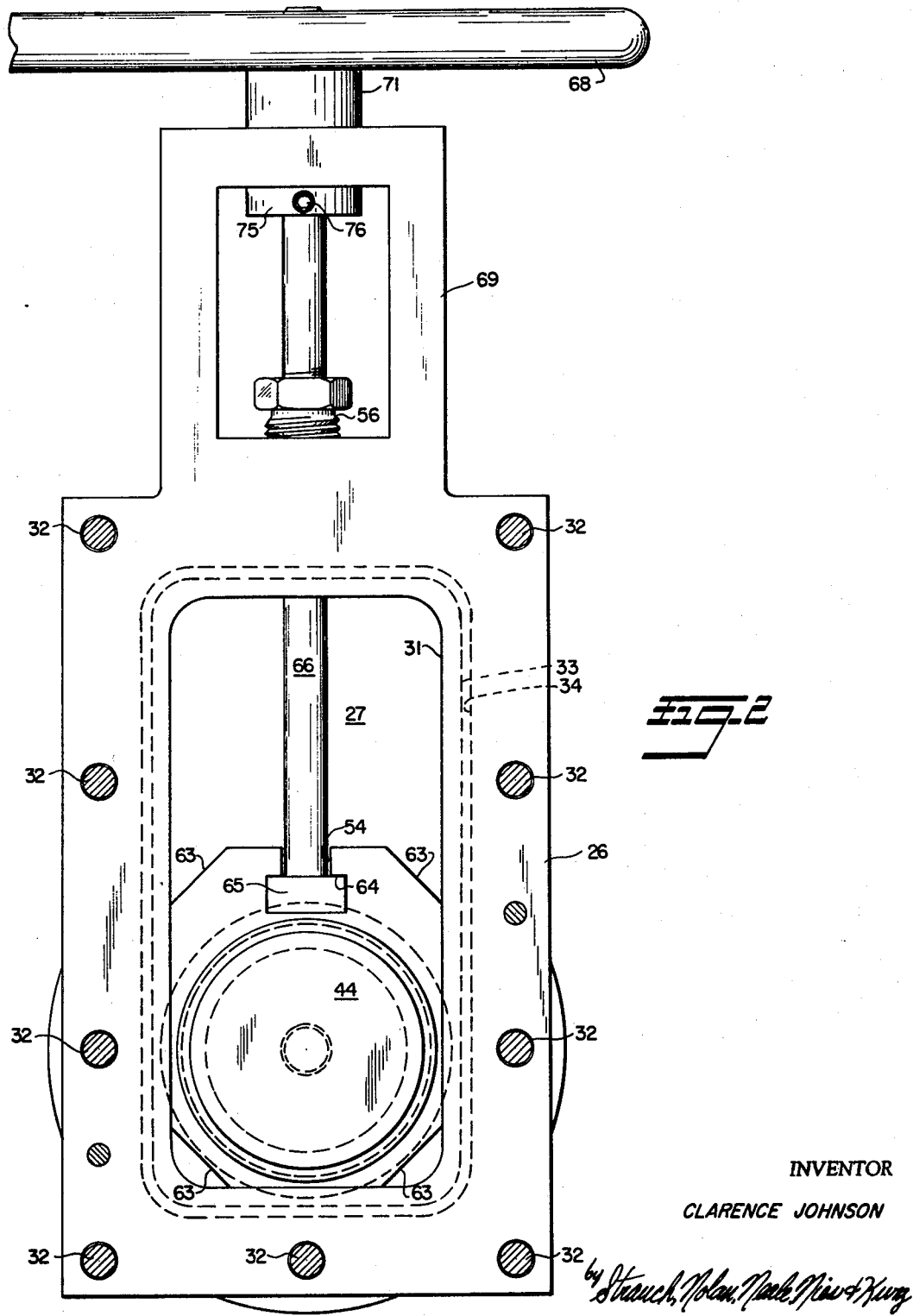

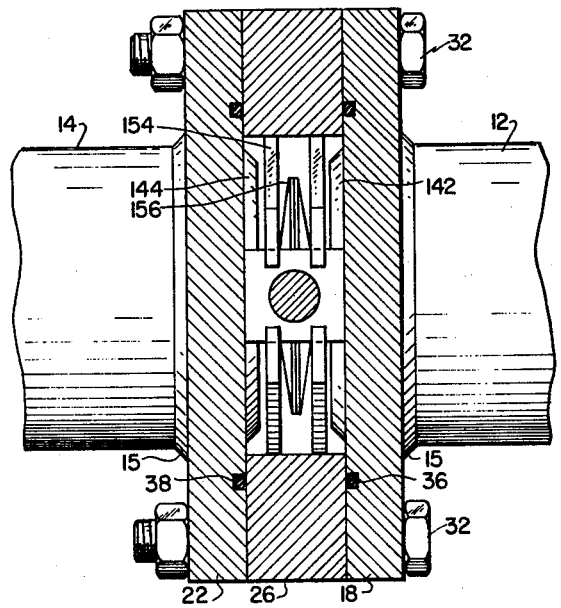
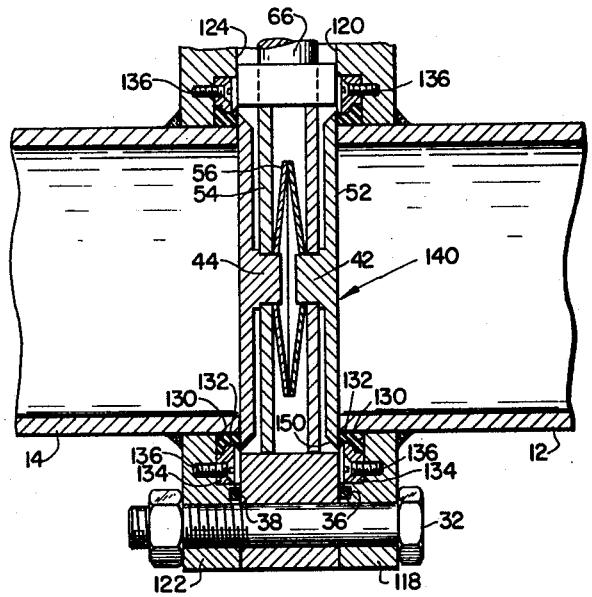

United States Patent Office 3,478,771
Patented Nov. 18, 1969

3,478,771
SECTIONAL BODY GATE VALVE WITH SEAT SCRAPING MEANS
Clarence Johnson, Cleveland, Ohio, assignor to AMCA Pharmaceutical Laboratories Ltd., St. Albert, Alberta, Canada
Filed Sept. 15, 1967, Ser. No. 668,060
Int. Cl. F16k 3/16, 25/00
U.S. Cl. 137—242                                    8 Claims

ABSTRACT OF THE DISCLOSURE

A gate valve having a sectional body including a pair of end sections forming opposed seat faces and an intermediate annular section sandwiched between the marginally opposed portions of the seat faces, the abutting faces of the sections being flat and readily accessible and machinable upon disassembly of the body, and a gate composed of a pair of discs spring biased apart to engage the seat faces of the end sections, and formed with bevelled edges forming knife edges to clean the seat faces as the gate moves between open and closed positions.

BACKGROUND OF THE INVENTION

This invention relates generally to valves, and more particularly to a sandwich-type gate valve wherein the critical seating faces between the gate and valve body are readily accessable for machining upon disassembly of the valve and the gate edges are bevelled to form self cleaning knife edges delimiting the sealing faces.

Gate valves of various constructions are known. Most commonly, the valve body is an integral cast member having internal seating surfaces with which a gate member cooperates to restrict the flow of fluid when the gate is in closed position. A problem with this type of construction is that the seating areas are difficult to reach, thus making it cumbersome to clean or renew the seats after the valve has been used. Consequently, the life of the valve is shortened significantly because of failure of the seats.

Another problem with conventional gate valves is that quite often they do not seat well upon closure due to dirt and deposits which have collected upon the valve seats during periods when the valve was open and fluid was passing through the valve port. These deposits prevent the gate, upon closing, from accurately and fully engaging the seats thus causing an ineffective seal to be formed.

Attempts to remedy these deficiencies have been made. Removable seat inserts have been provided at the seating areas, which inserts may be discarded and replaced after a period of time. These have been somewhat successful, but still the problem of inaccessibility due to their location within the valve body, the collection of dirt deposits, and in addition, the cost of replacement have been unsatisfactory. Another approach has been to provide sectional valves which may be disassembled for repair. However, none of the known types have been entirely satisfactory, since they either fail to expose the seating surfaces completely upon disassembly of the valves or to compensate for removal of seat face material in refinishing the sealing faces and do not provide any cleaning function during operation of the valve.

SUMMARY OF THE INVENTION

A primary object of this invention is to provide a sandwich-type gate valve which may be readily repaired and reconstructed for continued usage.

Another object of this invention is to provide a sandwich-type gate valve wherein the critical seating faces are fully exposed for easy cleaning and accurate machining upon disassembly of the valve.

Another object of this invention is to provide a sandwich-type gate valve formed to provide self-cleaning of the body seat faces upon closing movement of the gate.

The invention accomplishes the above objects and overcomes the prior art disadvantages by providing a valve body including two end sections having flanged fluid inlet and outlet port connections and respective oppositely related flat wall faces and an intermediate section sandwiched between the marginal portions of the opposed flat faces of the end sections, the opposing faces of the body end sections and annular section being planar surfaces and readily accessible upon disassembly of the valve body. A gate is suspended by its stem from the annular body section between the end sections and has oppositely facing planar faces for sliding engagement with the respective seat faces of the end sections in moving to open and close the fluid port. In one embodiment, flexible seals are provided at the seating surfaces between the gate and body end sections. In another embodiment, the gate includes opposed disc members biased away from each other into metal to metal sealing engagement with the seat faces of the end sections, with the discs being formed to provide a cleaning function on the seat faces of the body end sections. In still another embodiment, annular seat inserts cooperate with the disc members when the gate is in closed position to form dependable seals.

BRIEF DESCRIPTION OF THE DRAWINGS

FIGURE 2 is a sectional view along line 2—2 of FIGURE 1 looking in the direction of the arrows;

FIGURE 3 is a sectional view along line 3—3 of FIGURE 1;

FIGURE 4 is a partial vertical sectional view of still another embodiment of the invention.

DESCRIPTION OF THE PREFERRED EMBODIMENT

Figure 1:
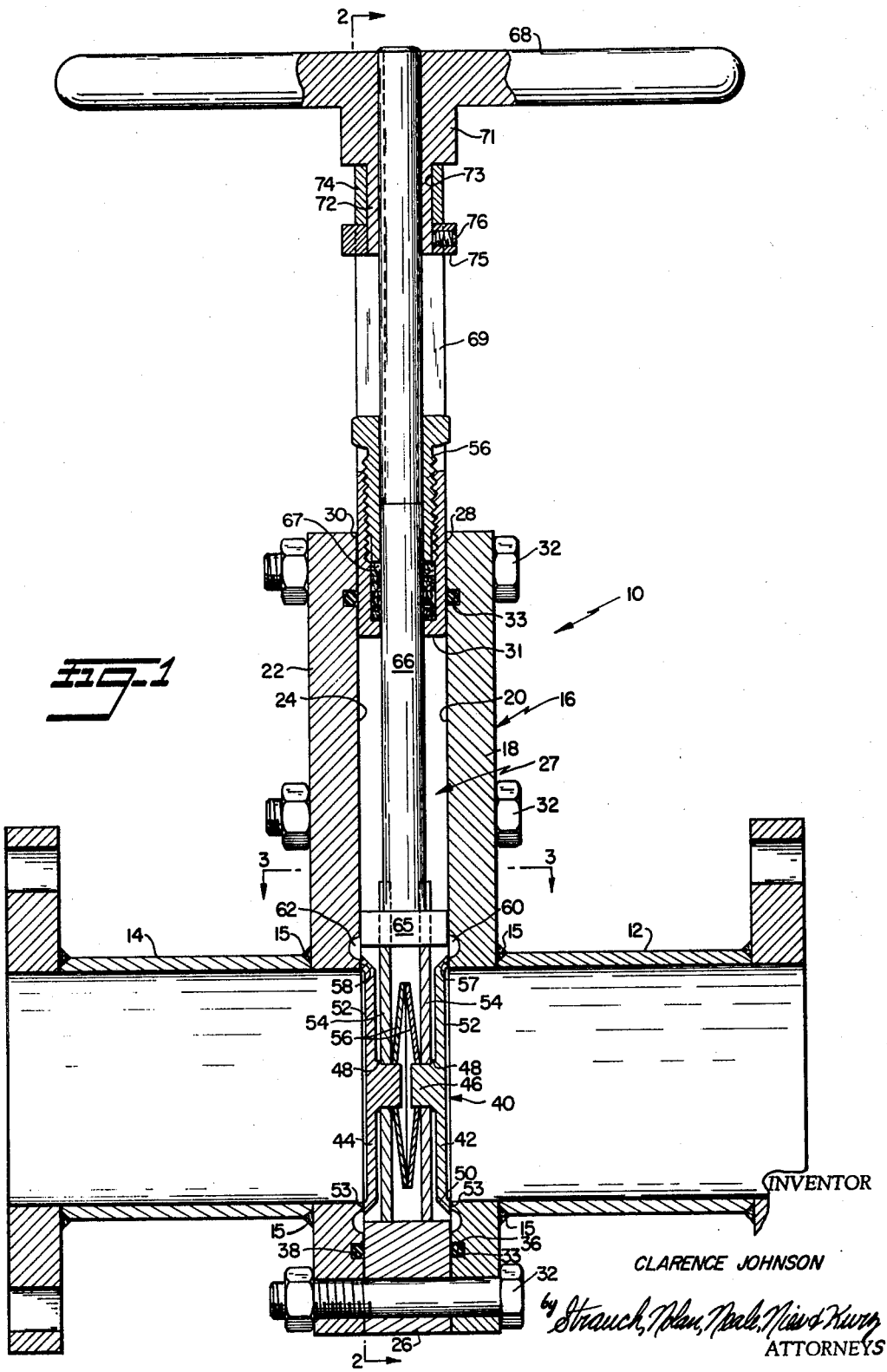
FIGURE 1 is a vertical sectional view of a preferred embodiment of the invention.

With continued reference to the drawings wherein the same reference numerals are employed throughout the several views to designate the same parts and referring first to FIGURES 1 and 2, a gate valve 10 includes flanged tubular inlet and outlet pipe members 12 and 14 butt welded at 15 to the end sections of a sectional valve body 16 comprising an apertured end section 18 fixedly mounting the inner end of member 12 and provided with a flat highly finished inner face 20, a second apertured end section 22 fixedly mounting the inner end of member 14 and provided with an opposing flat highly finished inner face 24 and an intermediate, generally rectangular, ring-like section 26 having oppositely directed highly finished flat faces 28 and 30 and an open center 31 of rectangular configuration sandwiched between the marginal edge portions of the opposing flat faces 20 and 24 of end sections 18 and 22. Body sections 18, 22 and 26 are secured together by a series of peripherally spaced bolt and nut assemblies 32 drawn tight to abut the mating areas of faces 20 and 24 with the respective mating areas of faces 28 and 30 of intermediate section 26 to form a valve chamber 27 in fluid communication with the axially aligned bores of members 12 and 14. The mating areas of faces 20 and 24 are respectively formed with intersecting grooves 33 joined at their intersecting ends by curved merging sections 34 to form respective continuous grooves to receive sealing O-rings 36 and 38 diametrically dimensioned to protrude slightly beyond grooves 33 and be deformed by engagement with the opposing faces 28 and 30 of intermediate section 26 and positively seal the body sections against escape of fluid outwardly from chamber 27.

A gate 40, comprising two identical metallic circular discs 42 and 44 of a diameter greater than the bores of members 12 and 14 having respective hubs 46 flanged at 48, and rearwardly beveled peripheral edges 50 forming scraper knife edges at the forward peripheral corners of peripheral rims 53 axially protruding beyond faces 52 to sealing abut the opposing flat faces of end sections 16 and 22 are mounted in plates 54 apertured to receive hubs 46 which also mount loading springs 56, for example abutting Belleville springs capable of producing 200–300 p.s.i. axial pressure biasing discs 42 and 44 away from each other to sealingly engage the oppositely directed rims 53 of the discs against seat areas 57 and 58 formed on faces 20 and 24 and form a metal to metal seal around the fluid ports formed by the bores of members 12 and 14 in valve closed position. This guide plate and spring arrangement permits the gate discs to be self adjusting with respect to the seat faces. The beveled peripheral edges 50 of the gate discs scrape deposits and dirt from seat faces 20 and 24 as the gate is moved between its open and closed positions thus assuring an effective seal when closed. Annular recesses 60 and 62 are provided in end faces 20 and 24 in outwardly spaced relation to the bores of members 12 and 14 to delimit the respective seat areas 57 and 58 and accommodate dirt and deposits removed during closing of the valve.

Plates 54 are dimensioned to slidingly engage the vertical side walls of the open center 31 of intermediate section 26 inwardly disposed with respect to ring grooves 33 are bevel cut across their corners as indicated at 63 and are formed centrally of their upper edges with respective upwardly opening T-slots 64 (FIGURE 2) adapting them to receive in mating interlocking relation the enlarged diameter end 65 of valve operating stem 66. End 65 fits freely in slots 64 and stem 66 extends upwardly through a packing gland 67 formed in the upper wall of intermediate section 26 into threaded engagement with an operating handwheel 68 journalled in a rectangular yoke 69 integrally formed on the upper wall of intermediate section 26. Handwheel 68 is formed with a stepped hub 71 the outer reduced portion 72 of which extends downwardly through a journal bore 73 formed in the topmost cross-piece 74 of yoke 69 and is fixed against relative axial movement in bore 73 by a retaining ring 75 fixed to hub portion 72 in any suitable manner as by set screw 76. Upon rotation of handwheel 68 stem 66 threads in and out of hub 71 to shift gate 40 between its open and closed positions scraping dirt and deposits from the abutting areas of faces 20 and 24 and seats 57 and 58 as it moves assuring full metal to metal sealing contact of rims 53 with the faces and seats at all times.

DESCRIPTION OF FIRST ALTERNATIVE EMBODIMENT

The embodiment of FIGURE 4 differs somewhat from that of FIGURES 1 and 2. In this embodiment valve body end sections 118 and 122 corresponding to end sections 18 and 22 have annular openings encircling the inner ends of flanged members 12 and 14 and are annularly recessed at 130 to receive respective annular seal members 132 constructed of a hardened yet somewhat flexible plastic material, such as Teflon, held in place by respective stepped retainer rings 134 fixedly connected to the lower walls of annular recesses 130 by screws 136.

The disc faces 52 of this embodiment are flat and their peripheral rearward edges are beveled sharply as shown at 50 to form scraper knife edges for scraping deposits from the inner faces 120 and 124 of end sections 118 and 122 and the inner ends of members 12 and 14 to assure full sealing engagement of disc faces 52 with the tips of seal members 132.

It is apparent from the above description of the disclosed embodiment that the sandwich-type valve construction provides ready access to the seating surfaces when the valve body 16 is disassembled. Since the abutting faces of the various disassembled elements are flat, outside surfaces, they may be readily ground or machined smooth over their full face areas when the valve is disassembled to maintain or restore optimum operating clearances of the valve and desired effective sealing over years of usage. The biasing springs compensate for removal of seat face metal assuring proper sealing engagement at all times.

Additionally, the several embodiments provide a gate valve which is self cleaning in varying degrees and in certain embodiments self adjusting assuring effective sealing upon closure of the gate even after long periods of non-use during which time deposits may have collected on the valve seats.

The invention is particularly applicable to large valves at low fluid pressure up to about 125 p.s.i., but it may also be applied to valves for higher pressure service merely by reinforcing the valves suitably.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a gate valve having a sectional body comprising respective end sections having opposed flat machined faces and formed at oppositely related ends with through passages forming respective inlet and outlet passages and formed inwardly from their peripheral edges with continuous ring grooves fitted with respective O-ring seals and an intermediate section of generally ring-like configuration having oppositely facing flat machined faces sandwiched between the opposing flat machined faces of the respective end sections with its flat faces in respective abutting sealing engagement with said O-ring seals and said opposing flat machined faces to delimit a valve chamber, said intermediate section also being provided at one point with a radially directed packing gland and an aligned valve stem supporting yoke; a gate comprising an operating stem extending through said packing gland and said yoke, an operating handwheel journalled in said yoke and threadedly engaging the outer end of said operating stem, and a pair of oppositely facing discs of a diameter greater than said inlet and outlet passages interconnected to the inner end of said operating stem for conjoint movement by plate means including spring means operative to impose an axial separating force to said discs sufficient to establish a sealing engagement between the oppositely directed faces of said discs and the opposingly related end sections.

2. The gate of claim 1 wherein said plate means comprises a pair of apertured plate members suspended from the inner end of said operating stem for axial follower movement with said stem between closed and open valve positions upon rotation of said handwheel, said pair of discs are provided on their opposing faces with centered hubs interfitting in and protruding through the respective apertures of said plate members, and said spring means comprises a pair of Belleville springs respectively mounted on the protruding portions of said disc hubs with their peripheral margins in abutting contact.

3. The gate valve of claim 2 wherein the periphery of each of said discs defining its oppositely directed face is inwardly bevelled to form a peripheral knife edge movable over the opposing faces of said body end sections to scrape deposits and accumulated dirt from said faces thereby assuring a full sealing contact between said discs and said opposing end body sections.

4. The gate valve of claim 3 wherein the opposing faces of the respective end body sections in radial outward encircling relation to said fluid passages are recessed to define an annular seating surface and the opposing faces of said respective discs are formed to provide axially protruding annular rim portions engageable with said respective seating surfaces in the closed position of said gate.

5. The gate valve of claim 1, wherein said passages in said end sections are dimensioned to respectively receive the ends of inlet and outlet pipe connections, said respective flat faces of said end sections are annularly recessed in encircling relation to said received pipe ends, and seal means comprising respective hardened plastic rings having radially outwardly directed flanges at one end are disposed in said annular recesses in opposed relation to said peripheral disc edges with their flanged ends bottomed in said annular recesses and clamped therein by respective inwardly flanged clamp rings fixedly secured in said annular recesses in flange overlapping relation to said radially outwardly directed seal ring flanges by clamp screws threaded into tapped openings formed in the respective bottom walls of said annular recesses whereby positive sealing of said fluid passage is effected in the closed position of said gate by engagement of said opposing disc faces with said seal rings.

6. The gate valve of claim 3 wherein said end section faces are recessed in encircling relation to said inlet and outlet passages to form separated disc seating surfaces and channel means to receive dirt deposits as said discs clean said faces and seating surfaces during movement to closed position.

7. The valve of claim 1 wherein said end section faces have recesses in encircling relation to said inlet and outlet connections adjacent said port, and annular seat members are mounted in said recesses to sealingly engage said discs in their closed position.

8. The valve of claim 7 wherein said seat members are hardened plastic rings having peripheral end flanges bottomed in said recesses and screw fastened clamp ring means is disposed in said recesses in overlying relation to said peripheral flange to secure rings in place.

References Cited

UNITED STATES PATENTS

| | | | |
|---|---|---|---|
| 623,194 | 4/1899 | Vollmann | 137—242 |
| 1,836,374 | 12/1931 | Kelly | 137—242 X |
| 2,091,618 | 8/1937 | Szabo | 251—175 |
| 2,868,495 | 1/1959 | Lucas | 251—327 X |
| 2,913,220 | 11/1959 | Cover | 137—242 X |
| 3,002,525 | 10/1961 | Grove | 251—176 X |
| 3,069,129 | 12/1962 | Grove | 251—176 X |
| 3,118,461 | 1/1964 | Cloos | 137—242 |
| 3,130,952 | 4/1964 | Meyer | 251—176 X |
| 3,198,483 | 8/1965 | Anderson | 251—327 |
| 3,337,178 | 8/1967 | Gordon | 251—176 X |

FOREIGN PATENTS

| | | |
|---|---|---|
| 446,311 | 4/1936 | Great Britain. |
| 813,136 | 5/1959 | Great Britain. |

CLARENCE R. GORDON, Primary Examiner

U.S. Cl. X.R.

251—176, 327, 328, 329

UNITED STATES PATENT OFFICE
CERTIFICATE OF CORRECTION

Patent No. 3,478,771    Dated November 18, 19

Inventor(s)    Clarence Johnson

It is certified that error appears in the above-identified pat and that said Letters Patent are hereby corrected as shown below:

Column 1, after the inventor's name and residence, cancel "assignor to AMCA Pharmaceutical Laboratories, Ltd., St. Albert, Alberta, Canada".

SIGNED AND
SEALED
MAY 26 1970

(SEAL)
Attest:

Edward M. Fletcher, Jr.
Attesting Officer

WILLIAM E. SCHUYLER, JR.
Commissioner of Patents